United States Patent
Gao et al.

(10) Patent No.: US 9,131,417 B2
(45) Date of Patent: Sep. 8, 2015

(54) METHOD AND APPARATUS FOR CELL SELECTION AND HANDOVER IN LTE-ADVANCED HETEROGENEOUS NETWORKS

(71) Applicants: Long Gao, Santa Clara, CA (US); Joydeep Acharya, Sunnyvale, CA (US); Sudhanshu Gaur, Santa Clara, CA (US)

(72) Inventors: Long Gao, Santa Clara, CA (US); Joydeep Acharya, Sunnyvale, CA (US); Sudhanshu Gaur, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 67 days.

(21) Appl. No.: 13/743,605

(22) Filed: Jan. 17, 2013

(65) Prior Publication Data
US 2014/0200006 A1 Jul. 17, 2014

(51) Int. Cl.
*H04W 36/08* (2009.01)
*H04W 48/02* (2009.01)
*H04W 16/32* (2009.01)
*H04W 48/08* (2009.01)

(52) U.S. Cl.
CPC .............. *H04W 36/08* (2013.01); *H04W 48/02* (2013.01); *H04W 16/32* (2013.01); *H04W 48/08* (2013.01)

(58) Field of Classification Search
CPC ... H04L 5/0035; H04L 5/0073; H04L 1/0026; H04L 1/0027; H04L 1/0693; H04L 5/0007; H04L 5/0098; H04W 52/0216; H04W 52/243; H04W 64/00; H04W 72/082; H04W 72/1226; H04B 17/0045; H04B 17/0057
USPC ............ 455/438, 436, 422.1, 443, 456.5, 561
See application file for complete search history.

(56) References Cited

U.S. PATENT DOCUMENTS

| | | | |
|---|---|---|---|
| 2010/0303039 | A1 | 12/2010 | Zhang et al. |
| 2012/0165053 | A1* | 6/2012 | Yoon et al. ...................... 455/501 |
| 2012/0184206 | A1* | 7/2012 | Kim et al. ......................... 455/9 |
| 2013/0223416 | A1* | 8/2013 | Michel ........................... 370/336 |
| 2013/0322235 | A1* | 12/2013 | Khoryaev et al. ............. 370/229 |

OTHER PUBLICATIONS

European Search Report mailed on Feb. 18, 2014, Application No. 13194903.4-1854.
Ericsson, ST-Ericsson, "The issue of deliberately omitting PSS/SSS/PBCH/SIB-1 in ABS for FeICIC performance requirements definition", 3GPP TSG-RAN WG4 meeting, New Orlean, Nov. 12-16, 2012.
ITRI, "Considerrations on PBCH eICIC for CSG HeNB", 3GPP TSG-RAN WG1 meeting, Madrid, Spain, Aug. 23-27, 2010.

* cited by examiner

*Primary Examiner* — Chuong A Ngo
(74) *Attorney, Agent, or Firm* — Procopio, Cory, Hargreaves & Savitch LLP

(57) ABSTRACT

Example implementations are directed to systems and methods based on physical broadcast channel (PBCH) muting are utilized to avoid frequent cell selection/reselection and handover in a LTE-advanced heterogeneous network. In the example implementations, a pico eNB that is fully covered by a macro eNB or other pico eNBs transmits blank PBCH such that it is inaccessible to the UEs who perform cell selection/reselection. Furthermore, a macro eNB may handover a UE to the inaccessible pico eNB by signalling the necessary information to the UE to detect the inaccessible pico eNB. Frequent cell selection/reselection and handover may therefore be avoided in a dense deployment situation.

19 Claims, 11 Drawing Sheets

METHOD AND APPARATUS FOR CELL SELECTION AND HANDOVER IN LTE-ADVANCED HETEROGENEOUS NETWORKS

BACKGROUND

1. Technical Field

Example implementations are directed to cellular systems, and more specifically, to cell selection and handover in heterogeneous networks.

2. Related Art

The Long Term Evolution (LTE)-advanced network cellular system is designed to improve the spectral efficiency by reducing the cell size via heterogeneous deployment of a diverse set of enhanced Node Bs (eNBs). In a heterogeneous network, the macro eNBs are deployed with a high transmit power and the overlaid pico eNBs are deployed with relatively lower transmit power to improve the coverage and UE throughput. Such an overlaid deployment can also provide capacity gain by increasing the spatial reuse of the spectrum.

When a user equipment (UE) is powered on in an LTE-advanced network, the UE first performs cell selection. The UE may searches for a suitable cell (which could be a macro or pico cell) to associate with. During the process of cell selection, the UE measures reference signal strength (e.g., Reference Signal Received Power/Reference Signal Received Quality (RSRP/RSRQ)) for each neighboring cell and selects a cell based on some criterion, e.g., the cell with the highest RSRP value. After the UE selects a cell, the UE verifies the cell's accessibility by reading the master information block (MIB) carried over the physical broadcasting channel (PBCH). After the UE succeeds to verify the selected cell's accessibility, the UE will associate itself to the selected cell. If the UE fails to read the MIB of the selected cell, the UE will discard the selected cell and repeat the above procedure until the UE finds a suitable cell to associate with. After the UE is associated to a cell, its status becomes RRC_IDLE. Note that the UE in RRC_IDLE status may associate itself to another cell following the above cell selection/reselection procedure when it moves into a new area. If there are a large number of pico cells deployed in an area, a RRC_IDLE UE will perform frequent cell selection/reselection when it is moving, which may reduce battery life.

When a UE has data packets to transmit or receive, the status of the UE becomes RRC_CONNECTED. An eNB can handover a RRC_CONNECTED UE to another eNB based on the RSRP/RSRQ measurement information reported by the UE. Similar to the RRC_IDLE case, if there are a large number of pico cells deployed in an area, frequent handover may occur which may increase the probability of dropping calls.

SUMMARY

Aspects of the present application may include a base station, which may involve a memory configured to store information for a UE to connect to a cell formed by the base station; and a signal processing module configured to transmit a frame to the UE and to mute the stored information transmitted with the frame based on a condition.

Aspects of the present application may further include a system, which may involve a first base station, comprising a memory configured to store information for a UE to connect to a cell formed by the first base station, and a signal processing module configured to transmit a frame to the UE and to mute the stored information transmitted with the frame based on a condition; and at least one second base station.

Aspects of the present application may further include a computer readable storage medium storing instructions for executing a process. The instructions may involve storing information for a UE to connect to a cell formed by a base station; muting the stored information for a frame based on a condition; and transmitting the frame to the UE.

DETAILED DESCRIPTION

Consider an LTE-Advanced heterogeneous network, where macro enhanced NodeBs (eNBs) are deployed to provide the basic coverage and a large number of pico eNBs are used to further enhance the user equipment (UE) throughput. Due to the dense deployment and small size of the pico cells, frequent cell selection/reselection and handover may occur for a UE with high mobility, which may reduce its battery life and increase the probability of dropping calls. Example implementations can avoid frequent cell selection/reselection and handover in such a dense deployment scenario.

In the example implementations, systems and methods based on physical broadcast channel (PBCH) muting are utilized to substantially avoid frequent cell selection/reselection and handover in a LTE-advanced heterogeneous network. In the example implementations, a pico eNB that is fully covered by a macro eNB or other pico eNBs transmits blank PBCH such that the pico eNB is inaccessible to the UEs who perform cell selection/reselection. Furthermore, a macro eNB may handover a UE to the inaccessible pico eNB by signalling the necessary information to the UE to detect the inaccessible pico eNB.

Example Scenarios

Figure 1:
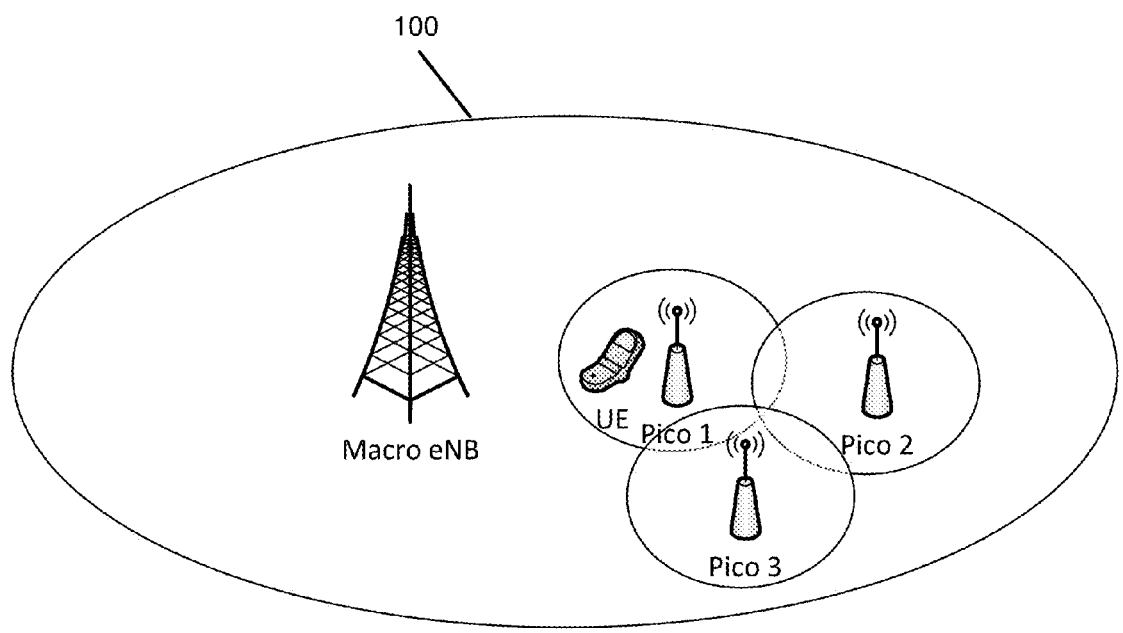
FIG. 1 illustrates an example macro-pico deployment scenario.

The example implementations described herein attempt to avoid frequent cell selection/reselection and handover for the RRC_IDLE and RRC_CONNECTED UEs, respectively, in a dense LTE-Advanced heterogeneous network where a large number of pico eNBs are deployed in an area. Consider the following two scenarios:

Macro-pico deployment scenario 1: In the first scenario, the pico cells (e.g., pico 1, pico 2, and pico 3) are deployed under the coverage of the macro cell 100 as shown in FIG. 1. The example implementations apply to both the macro eNB and the pico eNBs for downlink transmission (i.e., from eNB to UE) in this scenario.

Figure 2:
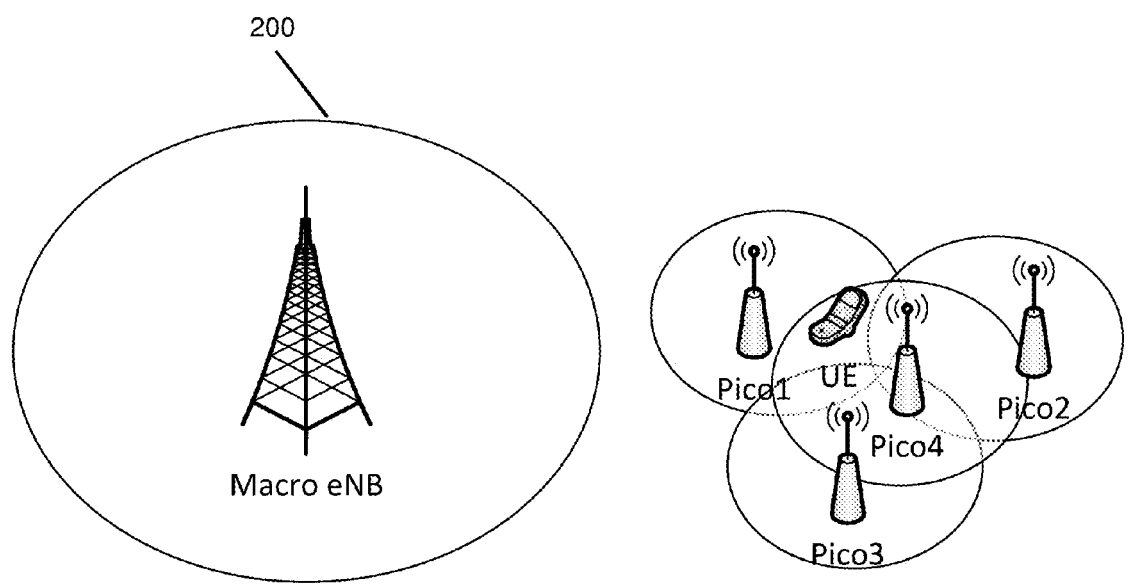
FIG. 2 illustrates an example macro-pico deployment scenario.

Macro-pico deployment scenario 2: In the second scenario, the pico cells (e.g., picos 1-4) are deployed outside the coverage of the macro cell 200 as shown in FIG. 2. In addition, some pico cells are fully covered by the combination of the other pico cells, e.g., pico 4 is fully covered by the combination of picos 1-3. The example implementations apply to pico eNBs for downlink transmission in this scenario.

Figure 3:
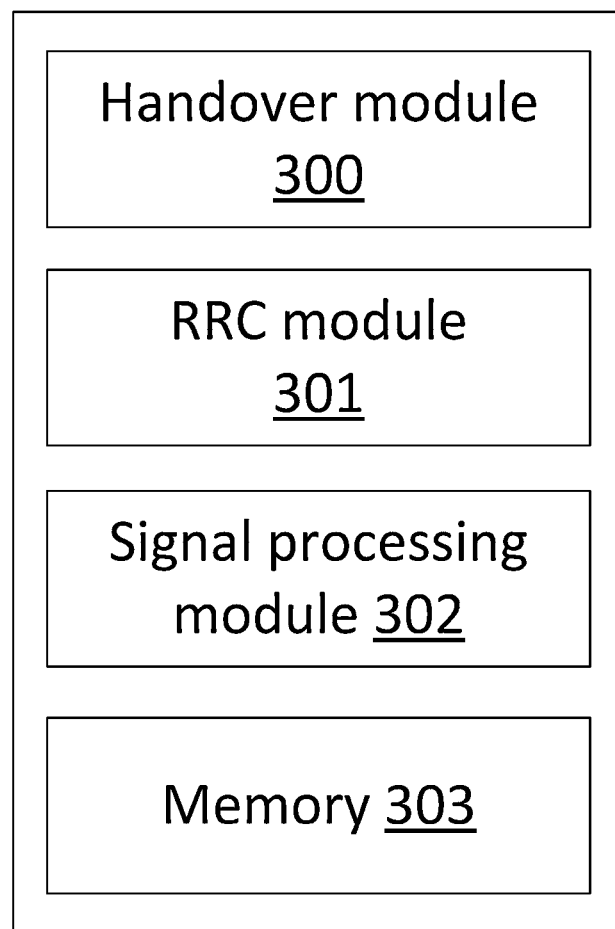
FIG. 3 illustrates a blog diagram of an eNB, in accordance with an example implementation.

FIG. 3 illustrates a block diagram of an eNB, in accordance with an example implementation. The eNB may be a macro or a pico eNB. The eNB may include one or more modules, such as the handover module 300, the RRC module 301, the signal processing module 302, and memory 303. The handover module 300 is responsible for the handover operation, and is described in further detail with respect to FIG. 10 and FIG. 11. The radio resource control (RRC) module 301 is configured to generate the necessary RRC signaling for the UE to detect the target eNB during the handover process. The signal processing module 302 is configured to generate the transmitted signal and to perform PBCH muting if needed. The memory 303 is configured to store the system information (e.g., the MIB) for the pico cells with PBCH muting and the data packets for UEs. The system information can be used by the UE to connect to the cell of the eNB.

The modules may be executed by a central processing unit (CPU) and stored in a memory. The memory may be in the form of a computer readable storage medium that stores instructions for executing a process. Computer readable storage mediums include tangible storage media such as random access memory (RAM), Hard Disk Drive (HDD), CD/DVDs, flash memory and the like. Alternatively, the modules may be stored in a computer readable signal medium instead of a memory, which may include non-tangible storage media such as carrier waves.

Figure 4:
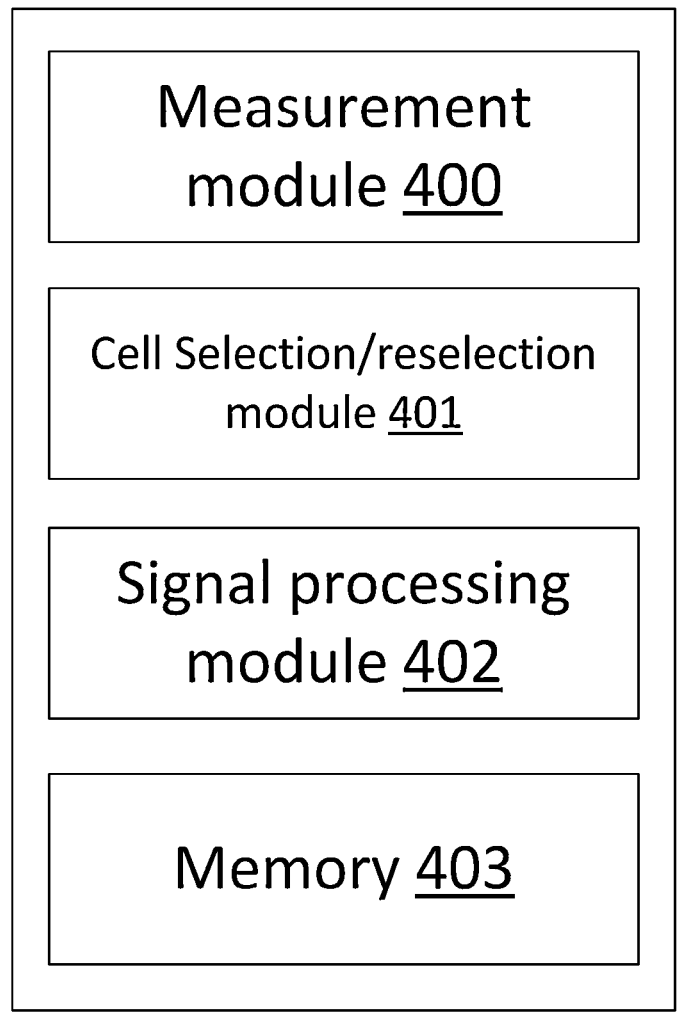
FIG. 4 illustrates a block diagram of a UE, in accordance with an example implementation.

FIG. 4 illustrates a block diagram of a UE, in accordance with an example implementation. The UE may include one or more modules, such as the measurement module 400, the cell selection/reselection module 401, the signal processing module 402, and the memory 403. The measurement module 400 is configured to measure the reference signal strength (i.e., RSRP/RSRQ) for the neighbouring cells and to send measurement results to its associated eNB. The cell selection/reselection module 401 is configured to choose the cell with which to associate when the UE is in the RRC_IDLE status. The signal processing module 402 is configured to decode the received signal. The memory 403 is configured to store the received packets.

Figure 5:
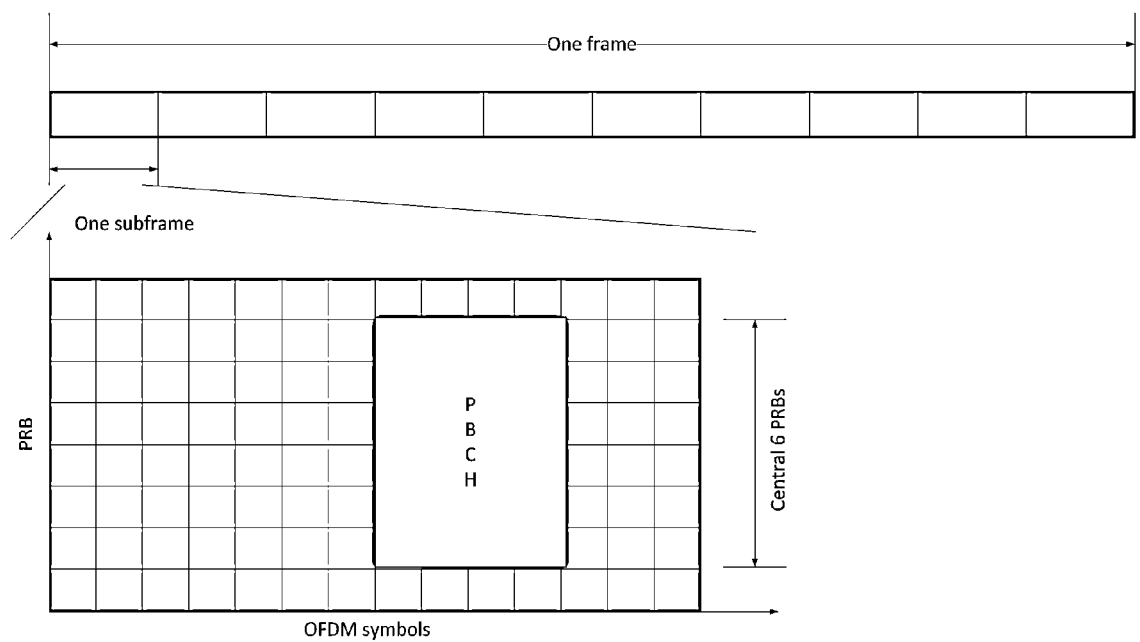
FIG. 5 illustrates an example frame structure for the LTE-Advanced downlink transmission and the concept of PBCH muting, in accordance with an example implementation.

FIG. 5 illustrates an example frame structure for the LTE-Advanced downlink transmission and the concept of PBCH muting, in accordance with an example implementation. As illustrated in FIG. 5, a LTE frame has ten subframes, which is further divided into 14 OFDM symbols with a normal cyclic prefix. In the first subframe of each frame, the central 6 physical resource blocks (PRBs) of the 8th OFDM symbol are used for PBCH, which carries the MIB information. Without reading the MIB of a cell, a UE cannot verify its accessibility and thus cannot connect to the cell. Therefore, a cell could be inaccessible to a UE via PBCH muting, i.e., transmitting blank PBCH.

Figure 6:
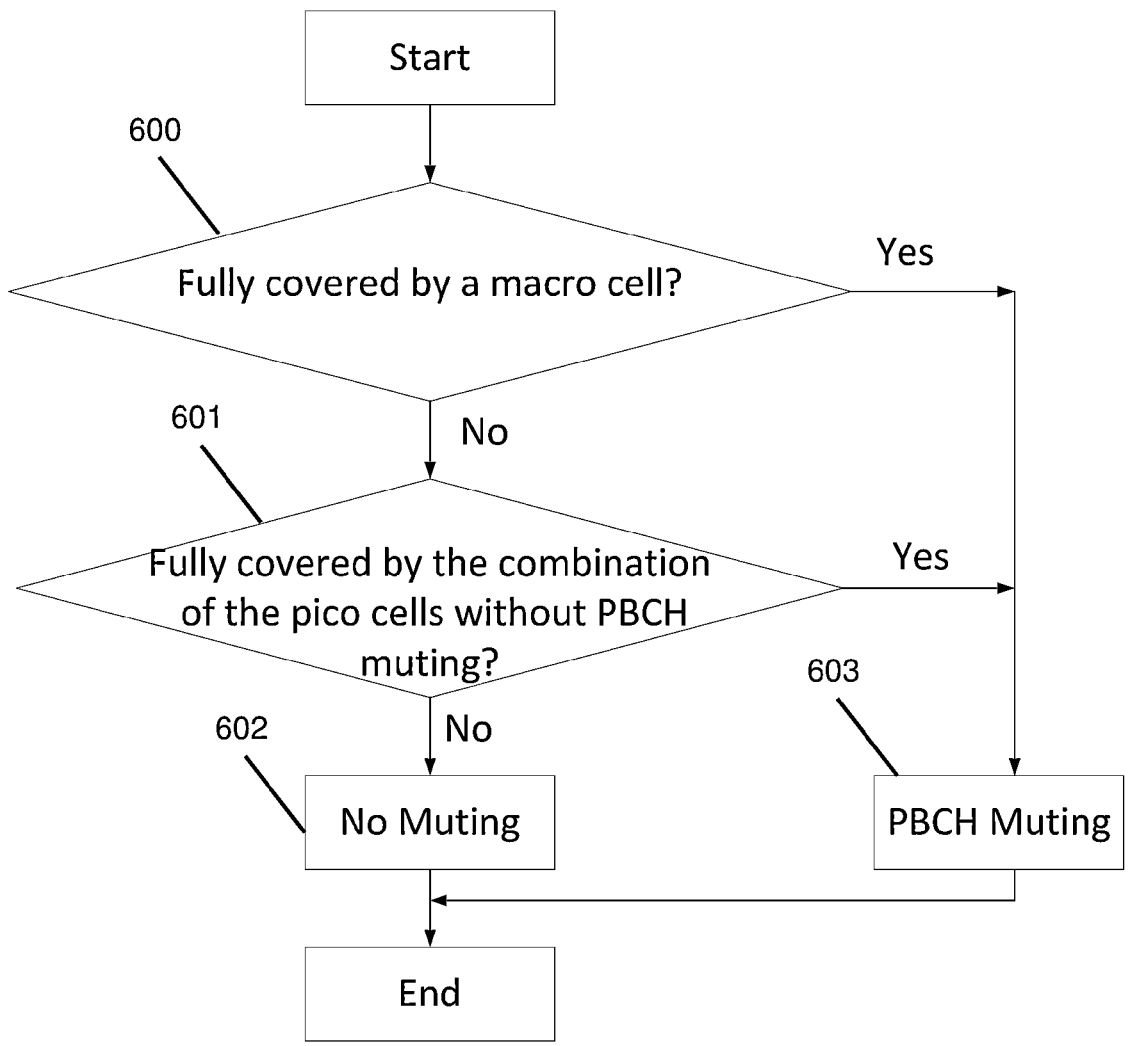
FIG. 6 illustrates a flowchart for configuring PBCH muting for an eNB, in accordance with an example implementation.

In example implementations, the macro eNBs always transmit MIB over PBCH without muting while the pico eNBs could be configured with PBCH muting. FIG. 6 illustrates a flowchart for configuring PBCH muting for an eNB, in accordance with an example implementation. When installing a pico eNB, the network operator first checks whether the pico cell formed by the pico eNB is fully covered by a macro cell at 600. If the pico cell is fully covered, the network operator will configure the pico eNB with PBCH muting as shown at 603. Otherwise, the network operator will check whether the pico cell is fully covered by the combination of the other pico cells without PBCH muting as shown at 601. If yes, the network operator will configure the pico eNB with PBCH muting as shown at 603. Otherwise, the PBCH muting will be disabled by the network operator as shown at 603. Alternatively, the network operator can first check whether the pico cell is fully covered by the combination of other pico cells and then check the macro cell coverage in order to decide whether configuring PBCH muting or not. As applied to the example scenario in FIG. 1, picos 1-3 will be configured with PBCH muting. As applied to the example scenario in FIG. 2, the PBCH muting is disabled in picos 1-3 while pico 4 is be configured with PBCH muting. Note that a pico eNB may configure the PBCH muting automatically by following the above example implementation. Once the pico eNB is configured with PBCH muting, the pico eNB will inform its neighbouring eNBs by sending its cell ID and MIB information over a backhaul. The eNB that receives the message will store such system information in its memory. Other conditions may also be used to determine if the frame is to be transmitted with PBCH muting (e.g., predetermined conditions, user setting, etc.).

Figure 7:
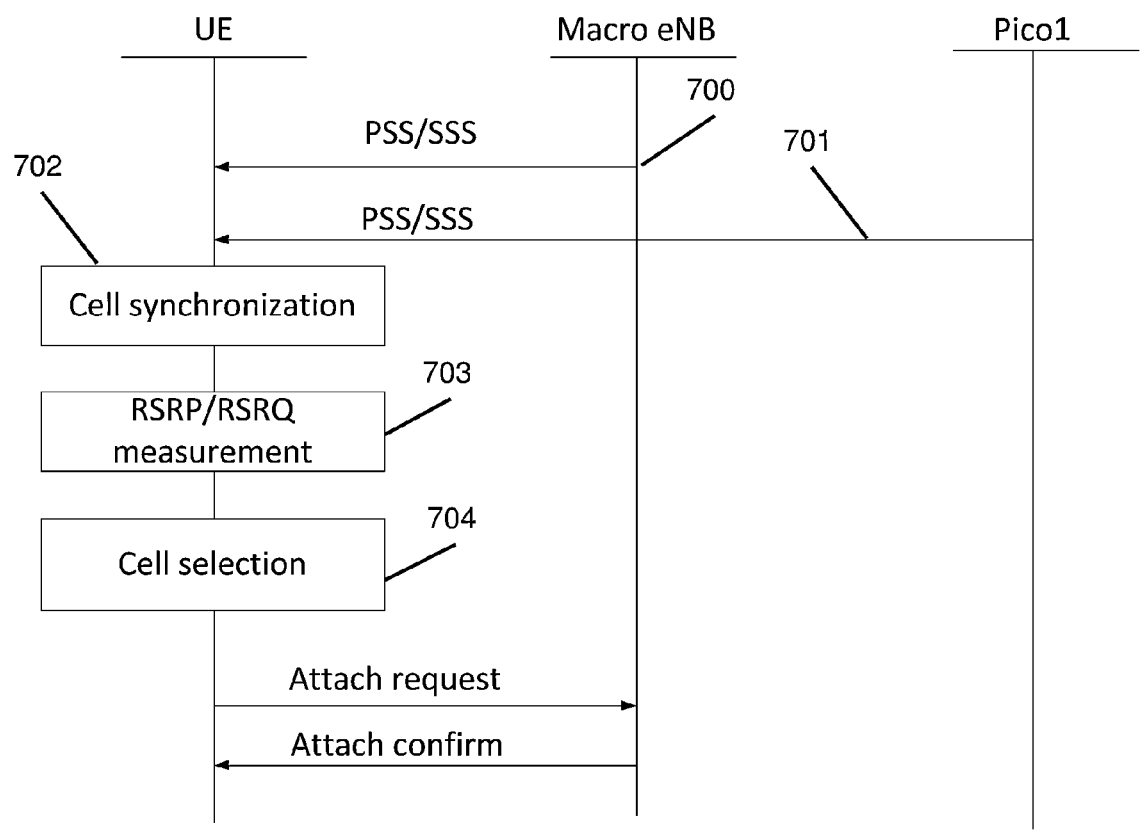
FIG. 7 illustrates an example flowchart of the cell selection/reselection for a RRC_IDLE UE in a macro-pico deployment scenario, in accordance with an example implementation.

FIG. 7 illustrates an example flowchart of the cell selection/reselection for a RRC_IDLE UE in a macro-pico deployment scenario, in accordance with an example implementation. The flowchart represents an example implementation for the scenario depicted in FIG. 1, where picos 1-3 are configured with PBCH muting and the macro eNB is configured without PBCH muting. The macro eNB and pico 1 send Primary Synchronization Signals/Secondary Synchronization Signals (PSS/SSS) separately for the UE to perform cell synchronization as shown at 700 and 701, respectively. After cell synchronization as shown at 702, the measurement module of the UE measures RSRP/RSRQ for the macro eNB and pico 1, respectively, as shown in 703. Based on the RSRP/RSRQ measurement results, the cell selection/reselection module of the UE chooses a suitable cell with which to associate as shown at 704.

Figure 8:
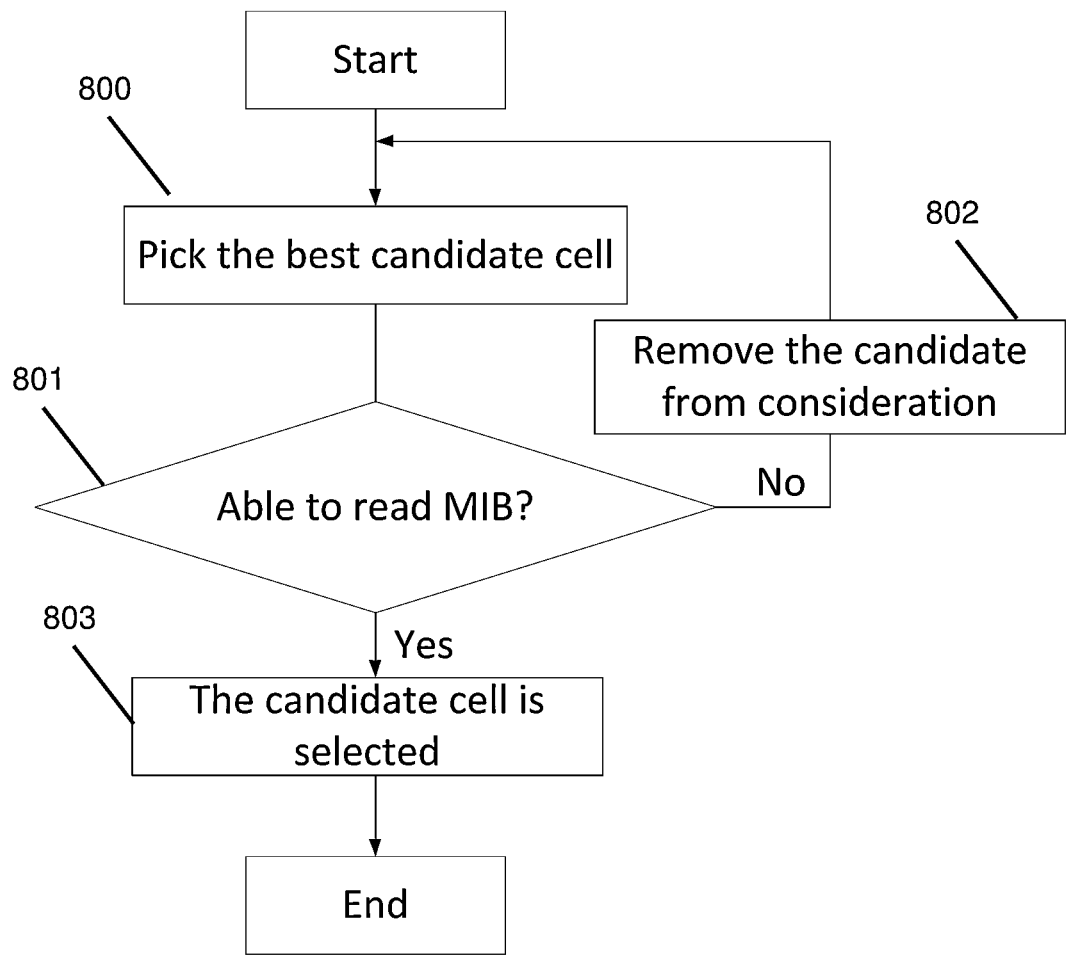
FIG. 8 illustrates an example flowchart for cell selection, in accordance with an example implementation.

FIG. 8 illustrates an example flowchart for cell selection, in accordance with an example implementation. In an example, assume that the RSRP values for the macro eNB and pico 1 are 5 and 10, respectively, and that the pico eNB is assumed to pick the cell with the highest RSRP value as the best candidate. In accordance with the example flowchart of FIG. 8 as implemented in the scenario of FIG. 1, the UE first picks pico 1 as the best candidate cell and tries to read its MIB as shown at 800 and 801, respectively. Since pico 1 is configured with PBCH muting, its MIB is unreadable. The UE then discards pico 1 and picks the macro eNB as the best candidate cell as shown at 802. Since the macro eNB is transmitting MIB over PBCH, the UE is able to read its MIB. As a result, the UE selects the macro eNB to associate with by sending an attach request over a random access channel (RACH) as shown at 803. Note that all RRC_IDLE UEs will be associated with the macro eNB in the macro-pico deployment scenario of FIG. 1, since all pico eNBs are configured with PBCH muting.

Figure 9:
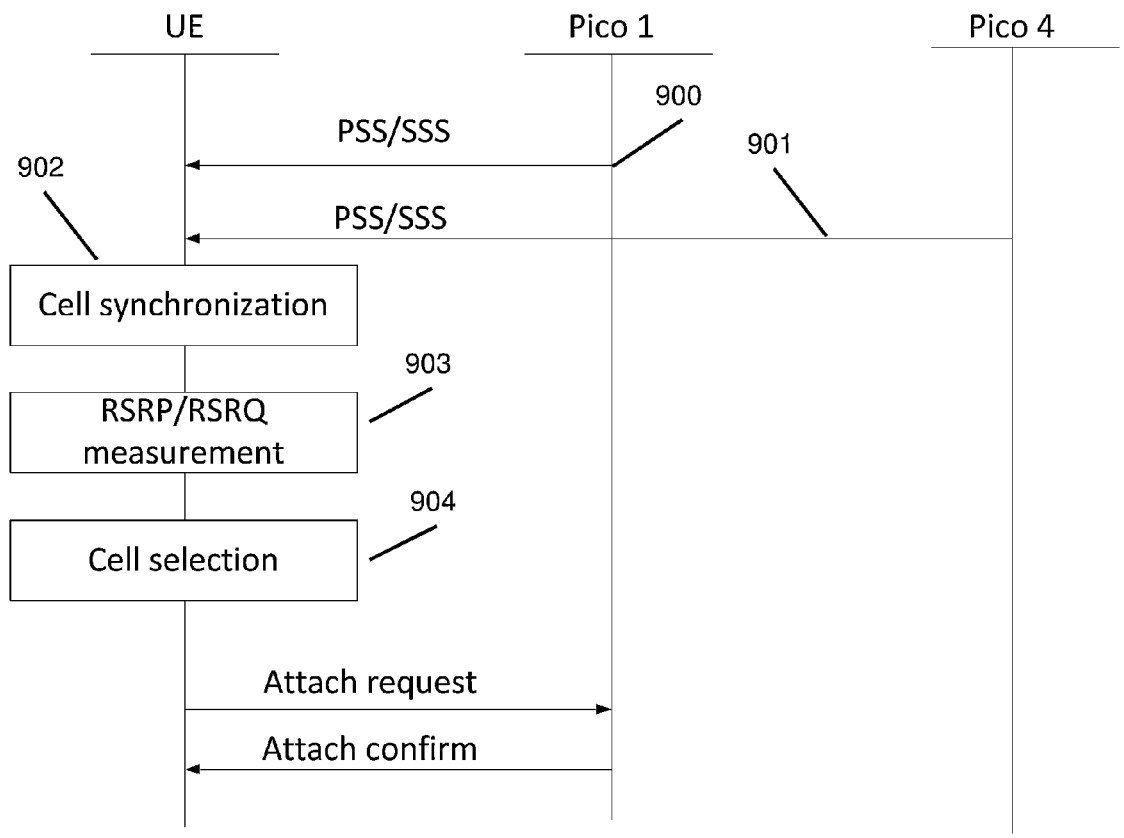
FIG. 9 illustrates an example flowchart of the cell selection/reselection for a RRC_IDLE UE in a macro-pico deployment, in accordance with an example implementation.

FIG. 9 illustrates an example flowchart of the cell selection/reselection for a RRC_IDLE UE in a macro-pico deployment, in accordance with an example implementation. The flowchart represents an example implementation for the scenario depicted in FIG. 2, where picos 1-3 are transmitting the MIB over PBCH and pico 4 is configured with PBCH muting. At the beginning, pico 1 and pico 4 send separately for the UE to perform cell synchronization, as shown at 900 and 901. After cell synchronization at 902, the measurement module of the UE measures RSRP/RSRQ for pico 1 and pico 4, respectively, as shown at 903. Based on the RSRP/RSRQ measurement results, the cell selection/reselection module of the UE then chooses a suitable cell with which to associate as shown at 904. The same cell selection flowchart of FIG. 8 may also be applied in this scenario. Thus, the UE selects pico 1 to associate with, regardless of the RSRP/RSRQ value for pico 4. Note that all RRC_IDLE UEs may be associated with the pico eNBs transmitting the MIB over PBCH (i.e., picos 1-3) in a macro-pico deployment.

Figure 10:
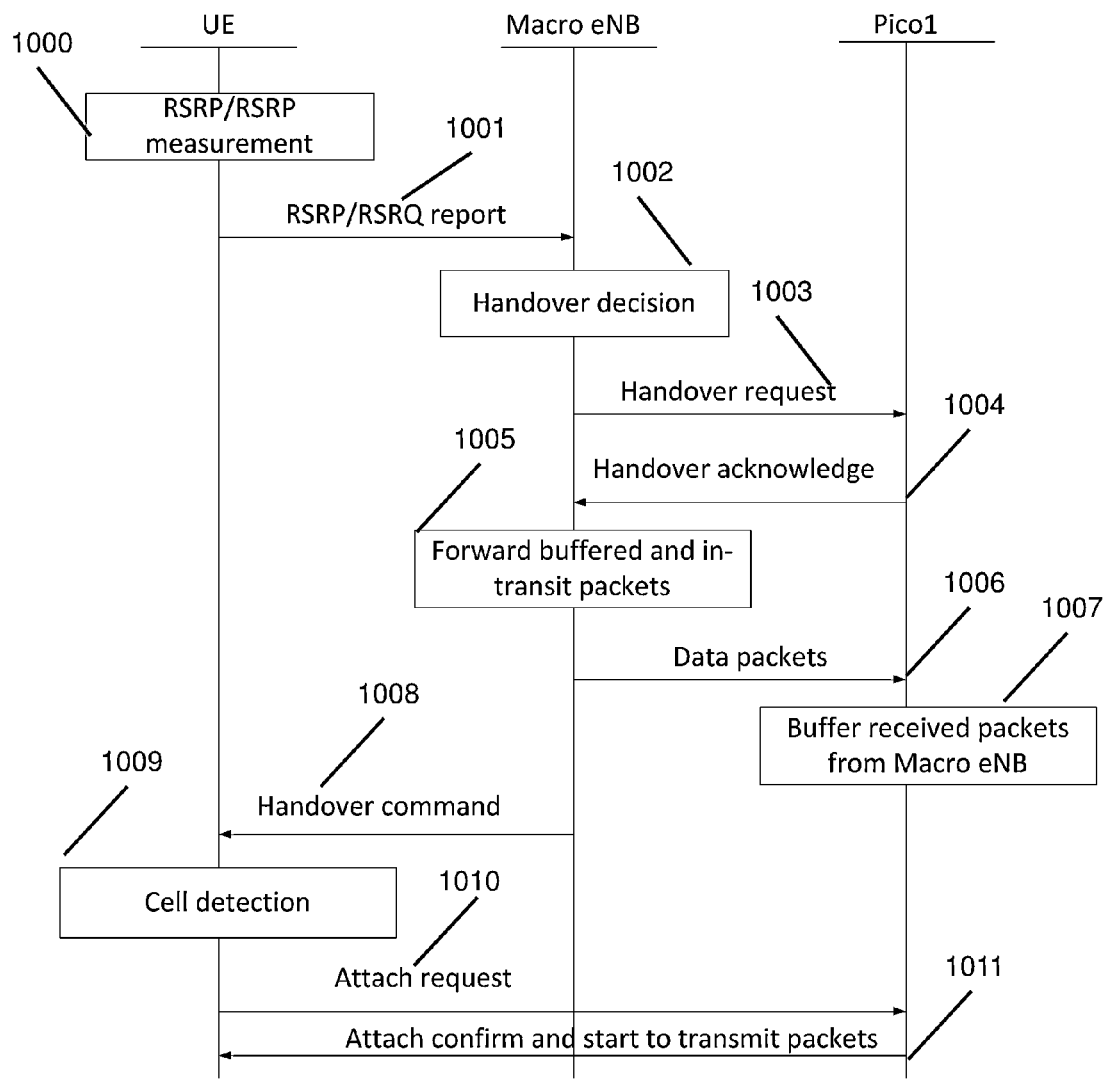
FIG. 10 illustrates an example flowchart for the handover of a RRC_CONNECTED UE in a macro-pico deployment, in accordance with an example implementation.

FIG. 10 illustrates an example flowchart for the handover of a RRC_CONNECTED UE in a macro-pico deployment, in accordance with an example implementation. The flowchart represents an example implementation for the scenario depicted in FIG. 1, where picos 1-3 are configured with PBCH muting and the macro eNB is configured without PBCH muting. The UE measures the RSRP/RSRQ values for the macro eNB and pico 1, respectively (shown at 1000) and reports the measurement results to the macro eNB (the UE is associated to the macro eNB in RRC_IDLE status), as shown at 1001. Based on the measurement reports from the UE and other information (e.g., the network overload), the handover module of the macro eNB decides to handover the UE to pico 1 and sends the handover request, as shown at 1002 and 1003. Note that any method for the eNB to make handover decision can be applied here. After receiving the acknowledgement from pico 1 as shown at 1004, the handover module forwards the buffered and in-transit packets for the UE to pico 1, as shown at 1005-1007. Afterwards, the RRC module of the macro eNB sends handover command to the UE via RRC signaling, which contains the MIB for pico 1, as shown at 1008. After receiving the handover command, the UE performs cell detection as shown at 1009, i.e., to read other system information, with the knowledge of the MIB for pico 1 and sends the attach request over RACH as shown at 1010. Finally, pico 1 confirms the attachment and starts to transmit packets to the UE, as shown at 1011.

Figure 11:
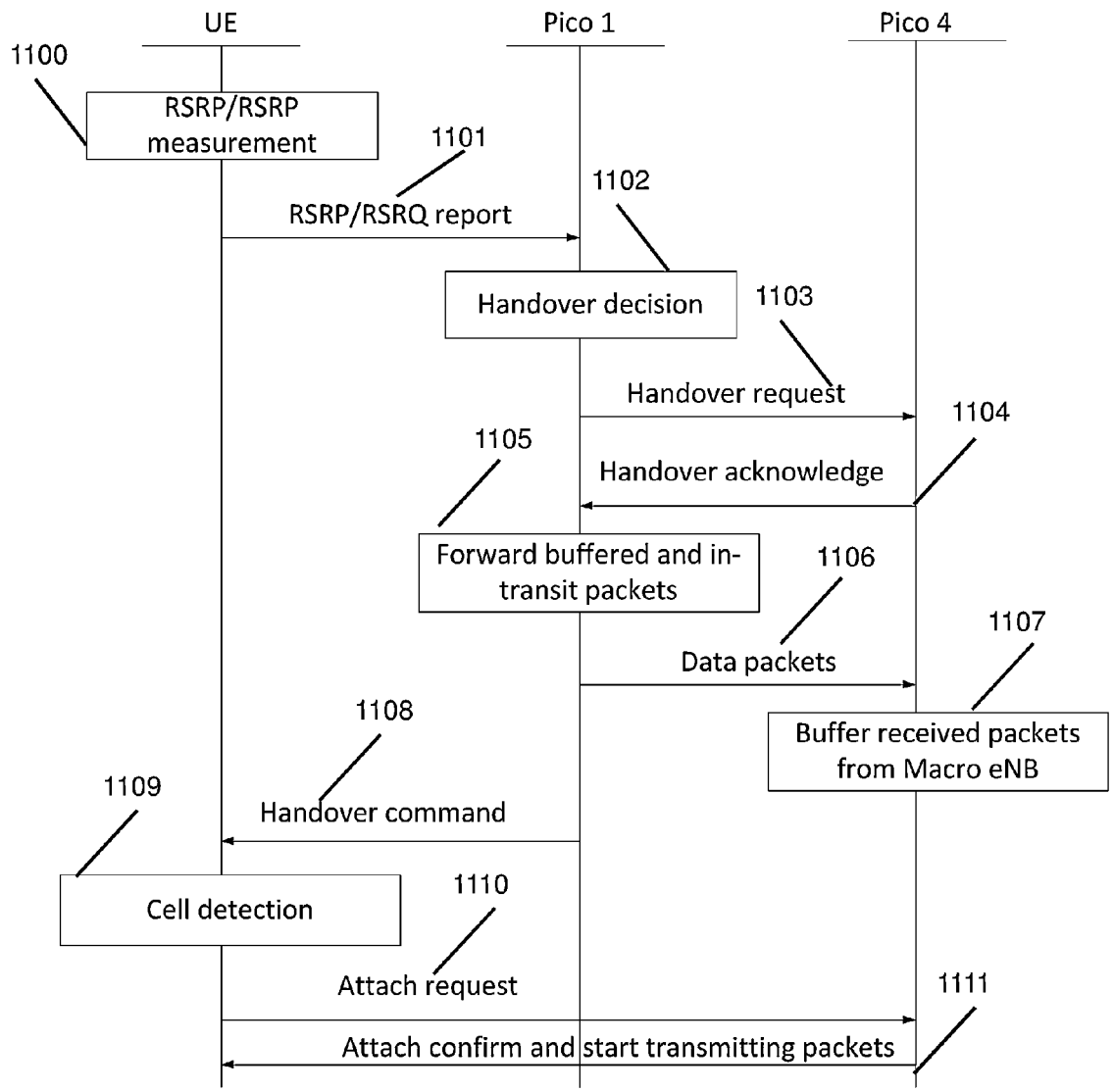
FIG. 11 illustrates an example flowchart for the handover of a handover of a RRC_CONNECTED UE in a macro-pico deployment, in accordance with an example implementation.

FIG. 11 illustrates an example flowchart for the handover of a RRCE, we show the flowchart of the handover of a RRC_CONNECTED UE in a macro-pico deployment, in accordance with an example implementation. The flowchart represents an example implementation for the scenario depicted in FIG. 2, where picos 1-3 are configured without PBCH muting and pico 4 is configured with PBCH muting. In this case, pico 1 plays the same role as the macro eNB in FIG. 10, and the flowchart process from 1000-1011 operates similarly as that of 1100-1111, with pico 1 instead of a macro eNB.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A base station, comprising:
   a memory configured to store system information for a user equipment (UE) to connect to a cell formed by the base station; and
   a signal processing module configured to transmit a frame to the UE and to mute the stored system information in a physical broadcasting channel (PBCH) of a first subframe of the frame, based on a condition, wherein the stored system information comprises information for the UE to connect to the cell formed by the base station.

2. The base station of claim 1, wherein the condition comprises a user setting for muting the stored system information.

3. The base station of claim 1, wherein the condition is based on whether the cell formed by the base station is covered by one or more cells formed by one or more other base stations.

4. The base station of claim 3, wherein the base station is a pico enhanced Node B (eNB), and wherein the one or more other base stations comprises at least one of a macro eNB and a plurality of pico eNBs.

5. The base station of claim 1, wherein the stored system information for the UE to connect to the cell formed by the base station is a master information block (MIB) carried over the physical broadcasting channel (PBCH) over the first subframe of the frame.

6. The base station of claim 1, wherein the signal processing module is configured to mute the stored system information by transmitting a blank physical broadcasting channel (PBCH) over the first subframe of the frame.

7. A system, comprising:
   a first base station, comprising a memory configured to store system information for a UE to connect to a cell formed by the first base station, and a signal processing module configured to transmit a frame to the UE and to mute the stored system information in a physical broadcasting channel (PBCH) of a first subframe of the frame, based on a condition, wherein the stored system information comprises information for the UE to connect to the cell formed by the base station.

8. The system of claim 7, further comprising at least one second base station, wherein the at least one second base station is configured to send a handover command to the UE, the handover command comprising the muted stored system information transmitted with the frame of the first base station.

9. The system of claim 7, wherein the condition comprises a user setting for muting the stored system information.

10. The system of claim 7, wherein the condition is based on whether the cell formed by the first base station is covered by one or more cells formed by the at least one second base station.

11. The system of claim 10, further comprising at least one second base station, wherein the first base station is a pico enhanced Node B (eNB), and wherein the at least one second base station comprises at least one of a macro eNB and a plurality of pico eNBs.

12. The system of claim 7, wherein the stored system information is a master information block (MIB) carried over the physical broadcasting channel (PBCH) over the first subframe of the frame.

13. The system of claim 7, wherein the signal processing module is configured to mute the stored system information for the UE to connect to the cell formed by the base station by transmitting a blank physical broadcasting channel (PBCH) over the first subframe of the frame.

14. A non-transitory computer readable storage medium storing instructions for executing a process, the instructions comprising:

storing system information for a User Equipment (UE) to connect to a cell formed by a base station;

muting the stored system information in a physical broadcasting channel (PBCH) of a first subframe of the frame based on a condition, wherein the stored system information comprises information for the UE to connect to the cell formed by the base station; and transmitting the frame to the UE.

15. The non-transitory computer readable storage medium of claim 14, wherein the condition comprises a user setting for muting the stored system information.

16. The non-transitory computer readable storage medium of claim 14, wherein the condition is based on whether the cell formed by the base station is covered by one or more cells formed by one or more other base stations.

17. The non-transitory computer readable storage medium of claim 16, wherein the base station is a pico enhanced Node B (eNB), and wherein the one or more other base stations comprises at least one of a macro eNB and a plurality of pico eNBs.

18. The non-transitory computer readable storage medium of claim 14, wherein the stored system information is a master information block (MIB) carried over the physical broadcasting channel (PBCH) over the first subframe of the frame.

19. The non-transitory computer readable storage medium of claim 14, wherein the signal processing module is configured to mute the stored system information by transmitting a blank physical broadcasting channel (PBCH) over the first subframe of the frame.

* * * * *